US009515535B2

(12) United States Patent
Carlin

(10) Patent No.: US 9,515,535 B2
(45) Date of Patent: Dec. 6, 2016

(54) TRANSFORMER INCLUDING A CONTACTLESS SIGNAL CONNECTION

(75) Inventor: Carl-Gustaf Carlin, Tyreso (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 462 days.

(21) Appl. No.: 14/129,852

(22) PCT Filed: Jun. 14, 2012

(86) PCT No.: PCT/EP2012/061320
§ 371 (c)(1),
(2), (4) Date: Dec. 27, 2013

(87) PCT Pub. No.: WO2013/000726
PCT Pub. Date: Jan. 3, 2013

(65) Prior Publication Data
US 2014/0145811 A1 May 29, 2014

(30) Foreign Application Priority Data

Jun. 30, 2011 (SE) .................................... 1150615

(51) Int. Cl.
H02K 7/14 (2006.01)
H02K 11/02 (2016.01)
(Continued)

(52) U.S. Cl.
CPC .............. *H02K 7/145* (2013.01); *H01F 19/00* (2013.01); *H01F 38/18* (2013.01); *B25B 23/14* (2013.01); *H02K 11/022* (2013.01)

(58) Field of Classification Search
CPC ....... H02K 7/145; H02K 11/022; H01F 19/00; H01F 38/18; B25B 23/14
(Continued)

(56) References Cited

U.S. PATENT DOCUMENTS 4,846,001 A * 7/1989 Kibblewhite ....... B25B 23/1425
310/322
5,181,575 A * 1/1993 Maruyama .......... B25B 23/1453
173/180
(Continued)

FOREIGN PATENT DOCUMENTS

DE 19 20 890 A1 11/1970
DE 40 25 430 A1 2/1992
(Continued)

OTHER PUBLICATIONS

International Search Report (ISR) dated Oct. 15, 2012 (in English) issued in International Application No. PCT/EP2012/061320.

Primary Examiner — John K Kim
(74) Attorney, Agent, or Firm — Holtz, Holtz & Volek PC

(57) ABSTRACT

An improved transformer (130) for use in a power tool (100) is disclosed, where the power tool (100) comprises a stationary body (110) and a shaft (120) being movable in relation to said body (110). The transformer (130) comprises a stator (210) being fixed in relation to said body (110) and including one or more stator windings (216). The transformer (130) also comprises a rotor (220) being movable with said shaft and including one or more rotor windings (226). A magnetic field B is shared by said one or more stator and rotor windings (216, 226) and is used for creating a contactless signal connection between said body and at least one sensor of said shaft. According to the present invention, the stator (210) and the rotor (220) are arranged for forming a mutual geometrical relationship such that said contactless signal connection is provided for different positions in both an axial direction A and a rotational direction R of said shaft. FIG. 2c.

12 Claims, 2 Drawing Sheets

(51) Int. Cl.
*H01F 38/18* (2006.01)
*H01F 19/00* (2006.01)
*B25B 23/14* (2006.01)

(58) Field of Classification Search
USPC .... 310/50, 68 B, 216.015, 216.016; 336/123
IPC .................. H02K 7/14,11/02; H01F 19/00
See application file for complete search history.

(56) References Cited

U.S. PATENT DOCUMENTS

| | | | | |
|---|---|---|---|---|
| 6,891,460 | B2* | 5/2005 | Tezuka | H02K 24/00 |
| | | | | 318/605 |
| 8,421,570 | B2* | 4/2013 | Schwander | H01F 41/061 |
| | | | | 336/118 |
| 2009/0200878 | A1* | 8/2009 | Walter | H02K 5/136 |
| | | | | 310/50 |
| 2009/0295523 | A1* | 12/2009 | Schwander | H01F 38/18 |
| | | | | 336/120 |
| 2011/0248583 | A1* | 10/2011 | O'Banion | B25B 21/00 |
| | | | | 310/50 |
| 2014/0145811 | A1* | 5/2014 | Carlin | H01F 38/18 |
| | | | | 336/123 |

FOREIGN PATENT DOCUMENTS

| | | |
|---|---|---|
| EP | 0 502 748 A1 | 9/1992 |
| JP | 2010-184329 A | 8/2010 |

\* cited by examiner

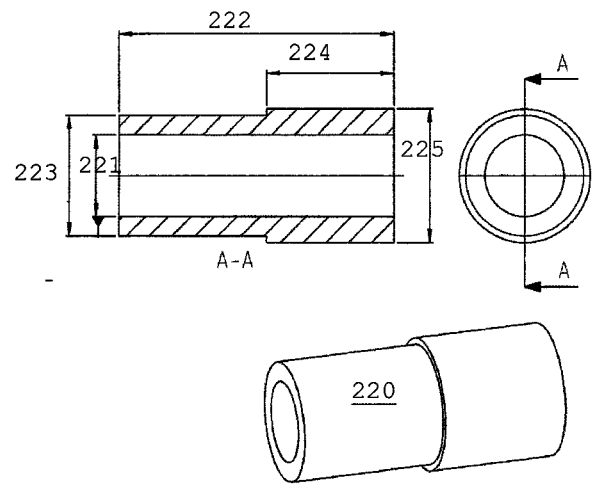
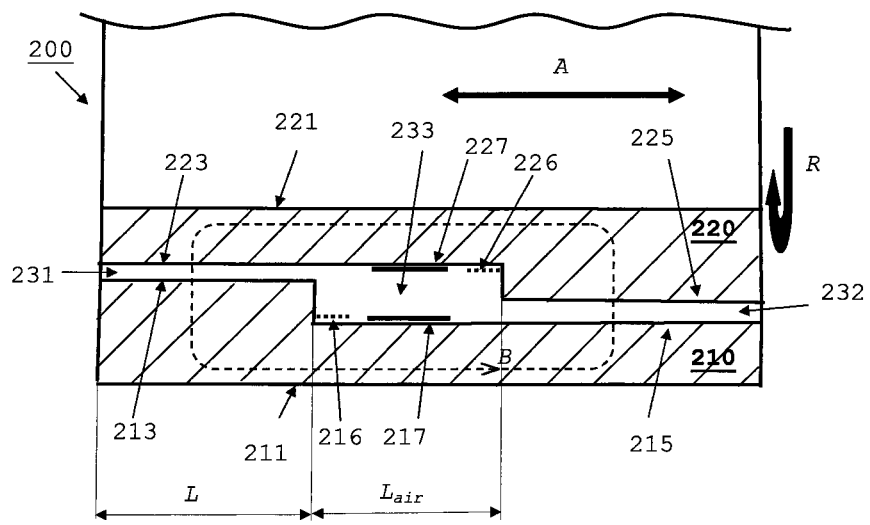
Fig. 2b
Fig. 2c

TRANSFORMER INCLUDING A CONTACTLESS SIGNAL CONNECTION

FIELD OF THE INVENTION

The present invention relates to a transformer and method for operating a power tool, using contactless transfer of sensor signals.

RELATED ART AND BACKGROUND OF THE INVENTION

In a power tool, such as a fastener tool being arranged for tightening a fastener, e.g. a nut-runner, it is important to being able to determine a clamping force being applied to a joint, for example by a threaded fastener, such as a nut, when it is tightened by the fastener tool. Generally, torque values of the torque being applied to the fastener and corresponding angle values are utilized for estimating this clamping force.

The torque being applied to the joint is here measured as a reaction torque generated in a reduction gearing of the fastener tool and corresponds to the torque the fastener exerts on the fastener tool while being tightened. The reaction torque does not fully reflect the dynamic torque being applied to the fastener, wherefore low accuracy measurements are provided when the fasteners are tightened at high speed.

Therefore, another solution, which eliminates the influence of the poor dynamic response in measurements, is preferable. One solution is then to utilize one or more sensors being located directly on the outgoing shaft.

For this solution, excitation signals to and sensor signals from the one or more sensors being located on a shaft of the fastener tool, which rotates in use, need to be coupled between the shaft and a body of the fastener tool in order to be able to perform such measurements. These sensor signals result from an excitation being based on the excitation signals. The excitation signals can e.g. be torque excitation signals or ultrasonic excitation signals.

One such signal coupling solution is to utilize slip rings for coupling the signals between the shaft and the body when measuring the torque. The use of slip rings does, however, have a disadvantage in that the slip rings get worn out, for example due to frictional wear, after having being used for some time. Also, the use of slip rings can limit the highest allowable rotational speed for the shaft.

Therefore, a contactless transfer of the sensor signals is more preferred. This can be achieved through the use of a rotary transformer. A rotary transformer is a transformer especially being arranged for coupling signals between two parts that rotate in relation to each other. Rotary transformers generally include first and second windings in separate first and second parts, respectively, not being in physical contact with each other. Magnetic flux provides the coupling between the first and second parts, by use of the mutual inductance coupling energy between the first and second windings. Such a rotary transformer is shortly described in EP 0 502 748. Here, a strain gauge is applied directly on the main spindle, i.e. on the shaft, and the output signal of the strain gauge is provided by a rotary transformer having a primary coil on the main spindle and the secondary coil on the housing of the tool.

However, the known rotary transformers, being utilized for torque measurements in a fastener tool having a body/housing being fixed in relation to the joint to be tightened, have a problem in that their electromagnetic coupling between the shaft and the body of the fixated tool is affected when the fastener is being tightened. Thus, after the fastener has been rotated a number of rounds, and thereby has moved down the thread, the signal coupling of the rotary transformer is lost, which is of course very disadvantageous since the measurement of the applied torque, and therefore the determination of the clamping force is thereby affected. Hereby, an inadequate clamping force being provided to the joint can result. This can seriously affect the reliability of the joint, and can also result in damage being made to the joint.

AIM AND MOST IMPORTANT FEATURES OF THE INVENTION

It is an object of the present invention to provide a transformer and a method that solve the above stated problem.

The present invention aims to provide a more flexible transformer and method than the ones known in the background art.

The transformer and the method according to the present invention are characterized in that a contactless signal connection is provided by the transformer, and that the contactless signal connection can handle both rotational and axial movements of the shaft of the fastener tool. This flexible signal connection, which provides a contactless sensor signal connection also when a fastener moves down the thread, is achieved by the geometrical constitution of the stator and the rotor of the transformer. The stator and the rotor are thus formed and arranged to have a mutual geometrical relationship, which allows for the shaft to also move in the axial direction without affecting the transfer of the excitation and sensor signals.

A reliable transformer is thereby provided, which keeps its signal connection intact during essentially all kinds of movements of the shaft in relation to the body of the tool. The tool may thereby flexibly be used in a large number of situations, including fixation of the tool, without risk of loss of the signal connection due to axial movement of the shaft. Thereby, a more robust clamping force determination is provided.

According to an embodiment of the present invention, the mutual geometrical relationship includes a geometrical relation between at least one part of the stator and at least one part of the rotor, wherein this geometrical relation is essentially unchanged during both rotational and axial movement of the shaft.

This geometrical relation is, according to an embodiment of the invention, constituted by a mutual distance between the at least one part of the stator and the at least one part of the rotor. Thus, there is, in use of the transformer, a distance between the stator and the rotor, which is unaltered when the shaft rotates and also when the shaft is shifted axially, e.g. due to tightening of a fastener such as a nut. Thereby, the signal connection of the transformer is made reliable and flexible to all kinds of movements for a shaft of e.g. a fastener assembly tool.

According to an embodiment of the invention, the stator is formed to have a one rim inner surface and rotor is formed to have a one rim outer surface. These one rim surfaces makes axial movement of the shaft possible, and the also together form the geometrical relationship being unaltered during this axial movement, whereby the signal connection is reliably provided.

According to an embodiment of the present invention, at least one of the stator and the rotor is at least partly shielded. The shielding means is here applied on at least part of at least one wall delimiting an air pocket between the stator and the rotor. Hereby the flux leakage over the air pocket is greatly reduced, which improves the transformer function.

According to an embodiment of the invention, the transformer is used for transferring excitation signals and sensor signals for an ultrasonic sensor. For ultrasonic sensors, it is essential that the contact between the ultrasonic sensor and the fastener is not lost. The present invention is therefore especially applicable for use of ultrasonic sensors, since axial shaft movement without loss of signal connection is possible due to the invention.

Detailed exemplary embodiments and advantages of the transformer and the method according to the invention will now be described with reference to the appended drawings illustrating some preferred embodiments.

BRIEF DESCRIPTION OF THE DRAWINGS

FIG. 2b shows a rotor according to the present invention.
FIG. 2c shows a stator and a rotor fitted together according to the present invention.

DETAILED DESCRIPTION OF PREFERRED EMBODIMENTS

Figure 1:
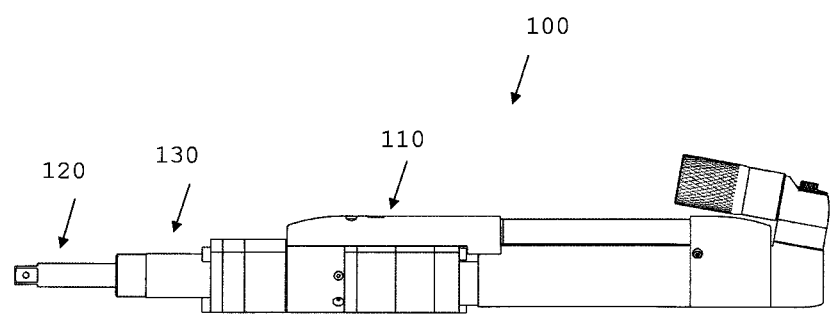
FIG. 1 shows a fastener tool.

FIG. 1 schematically shows a fastener tool 100. In this figure, only parts being essential for the function of the invention have been described. Other features of the fastener tool 100, such as handles, power supplying cables or batteries, the electrical motor, gearing equipment, and the socket holding the fastener, are also included in the fastener tool 100, as is understood by a skilled person.

The fastener tool 100 includes a body 110 and a shaft/spindle 120, which is movable in relation to the body 110. In use, the shaft 120 performs a rotational movement in relation to the body 110 e.g. when a fastener, such as a nut, is being tightened. The tool also includes a transformer 130, which provides a sensor signal connection between the shaft 120 and the body 110 of the fastener tool 100. Thus, sensors being provided on the shaft 120 receive excitation signals, such as torque excitation signals or ultrasonic excitation signals, being transferred by the transformer 130 from the body 110 to the shaft 120. More in detail, a control unit being included in the body 110 is coupled to the transformer 130. The control unit supplies the transformer 130 with excitation signals. The control unit can also be external to the tool 100, and be connected to the body and/or transformer 130 by a suitable connection, such as a cable or a wireless connection.

The transformer 130 also transfers sensor torque signals from the shaft 120 to the body 110. The transformer 130 is also coupled to the one or more sensors being arranged on the shaft 120. The control unit being included in the body 110 of the tool thus receives sensor torque signals that via the transformer 130 that are provided by the sensors based. These sensor torque signals are based on the excitation signals.

According to the present invention, the transformer 130 includes a stator, being fixed in relation to and included in the body 110 of the fastener tool 100, and a rotor, which is movable with the shaft 120. Thus, when the shaft 120 rotates, the rotor rotates with it.

Figure 2A:
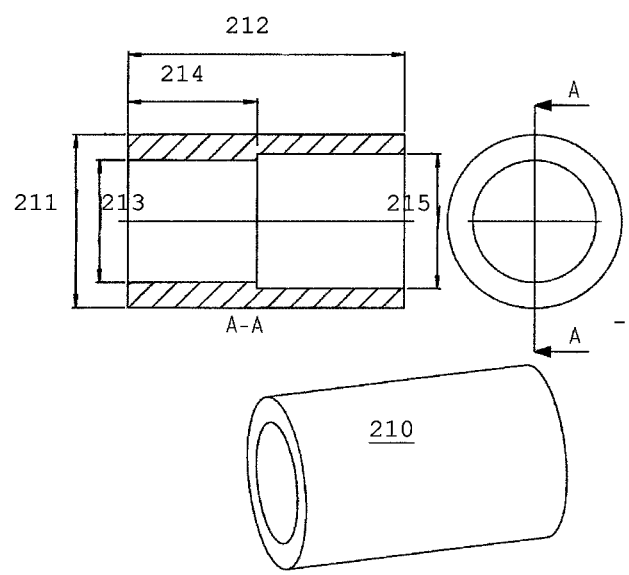
FIG. 2a shows a stator according to the present invention.

The stator 210 and the rotor 220 according to the present invention are shown in FIGS. 2a and 2b, respectively. The stator 210 and the rotor 220 are, according to the present invention arranged such that they have a geometrical relationship between them when fitted together, which allows a contactless signal connection to be provided when the shaft 120 performs a rotational movement in relation to the body 110 and also when the shaft 120 performs an axial movement in relation to the body 110. Thus, the stator 210 and the rotor 220 have a mutual geometrical relationship, i.e. they each have a form and are in use related to each other such that the signal connection is kept intact also when an axial movement of the shaft 120 occurs. This will be explained more in detail below in connection with FIGS. 2a-c.

The stator 210 has an essentially tubular form, having an outer peripheral diameter 211 being essentially equal for the whole length 212 of the stator 210. The stator 210 further has a first inner diameter 213 for a first part of the stator having a first length 214, and a second inner diameter 215 for a second part of the stator, where the first inner diameter 213 is smaller than the second inner diameter 215. In other words, the stator 210 is essentially tubular with an inner surface having one step, i.e. having a first part, which has a first inner diameter 213 being less than the second inner diameter 215 of the second part of the stator 210. In other words, the stator 210 has an inner surface containing one rim.

The rotor 220 also has an essentially tubular form, having an inner diameter 221 being essentially equal for the whole length 222 of the rotor 220. The rotor 220 further has a first outer diameter 223 for a first part of the stator, and a second outer diameter 225 for a second part of the rotor having a second length 224, where the first outer diameter 223 is smaller than the second outer diameter 225. Thus, the rotor 220 is essentially tubular with an outer surface having one step, i.e. has a first part, which has a first outer diameter 223 being less than the second outer diameter 225 of the second part of the stator 210. In other words, the rotor 220 has an outer surface containing one rim.

Also, the first outer diameter 223 of the rotor 220 is smaller than the first inner diameter 213 of the stator, and the second outer diameter 225 of the rotor 220 is smaller than the second inner diameter 215 of the stator. Thus, the rotor 220 can be inserted into the stator 210. When the stator 210 and the rotor 220 are fitted together like this, i.e. the rotor being inserted into the stator, air gaps are formed between the first parts of the rotor and stator, and between the second parts of the of the rotor and stator, respectively. Thus, the air gaps, having first and second distances/widths 231, 232, respectively, are here radially limited by the second (larger) outer diameter 225 of the rotor 220 and the second (larger) inner diameter 215 of the stator 210, and by the first (smaller) outer diameter 223 of the rotor 220 and the first (smaller) inner diameter 213 of the stator 210, respectively, as will be described below.

FIG. 2c shows a schematic longitudinal section view of part of the stator 210 and a part of the rotor 220 in use, i.e. when they are assembled together in the transformer, such that the rotor 220 is inserted into the stator 210. It is clearly shown in FIG. 2c that the one step/rim inner surface of the stator 210 and the one step/rim outer surface of the rotor 220 together form a mutual geometrical relationship between the stator 210 and the rotor 220. Thus, the first 213 and second 215 inner diameters of the stator 210 and the first 223 and second 225 outer diameters of the rotor 220 together form this mutual geometrical relationship. The first 213 and second 215 inner diameters of the stator 210 and the first 223 and second 225 outer diameters of the rotor 220 together form first 231 and second 232 mutual distances between the first and second parts, respectively, of the stator 210 and the rotor 220. FIG. 2c also shows the one or more stator windings 216 and the one or more rotor windings 226.

According to an embodiment of the invention, the mutual geometrical relationship includes at least one of these first 231 and second 232 mutual distances between the stator 210 and the rotor 220. Thus, the geometrical relationship is formed between at least one part of the stator 210 and at least one part of the rotor 220. This mutual geometrical relationship is essentially unchanged when the shaft 120 moves in a rotational direction, and, up to a predetermined length L, also in the axial direction A.

This can easily be understood from FIG. 2c, where it is clear that the first 231 and second 232 mutual distances do not change when the stator 210 and the rotor 220 rotate in relation to each other. It is also clearly shown that the first 231 and second 232 mutual distances do not change when the stator 210 and the rotor 220 move in the axial direction A in relation to each other, as long as the axial movement is shorter than a predetermined length L. Thus, the length L here depends on the first length 214 of the first part of the stator and to the second length 224 of the second part of the rotor. As can be seen in FIG. 2c, the first and second mutual distances 231, 232 are only kept unaltered until an axial movement corresponding to the shorter one of the first length 214 of the stator and the second length 224 of the rotor has been reached. Since the first length 214 of the stator is shorter than the second length 224 of the rotor in the non-limiting example shown in FIG. 2c, the length L here corresponds to the first length 214 of the stator.

According to an embodiment of the present invention, the predetermined length L is greater than a minimum length $L_{min}$. Thus, the shorter one of the first length 214 of the stator and the second length 224 of the rotor is here longer than the minimum length $L_{min}$.

According to an embodiment, the minimum length $L_{min}$ corresponds to a length the fastener is to be tightened in order to tighten a joint. Typically, the minimum length $L_{min}$ corresponds to a length of the threads of a screw or bolt to be tightened by the tool, such that the screw or bolt can be securely tightened.

According to an embodiment, the minimum length $L_{min}$ is related to the axial length of the rotary transformer. The minimum length $L_{min}$ is thus related to the whole length 212 of the stator 210 or to the whole length 222 of the rotor 220. In other words, the first length 214 of the first part of the stator is related to the whole length 212 of the stator 210, and the second length 224 of the second part of the rotor 220 is related to the whole length 222 of the rotor 220.

More specifically, according to an embodiment, the minimum length $L_{min}$ corresponds to 30%-60%, and preferably to 45%-50%, of the whole length 212 of the stator 210 and/or corresponds to 30%-60%, and preferably to 45%-50% of the whole length 222 of the rotor 220. Thus, if the first length 214 of the stator is shorter than the second length 224 of the rotor, then the first length 214 of the stator is 30%-60%, and preferably 45%-50%, of the whole length 212 of the stator. Correspondingly, if the second length 224 of the second part of the rotor is shorter than the first length 214 of the first part of the stator, then the second length 224 of the second part of the rotor is 30%-60%, and preferably 45%-50%, of the whole length 222 of the rotor 220. In other words, the inner surface of the stator 210 and the outer surface of the rotor 220 each have their one step/rim located at 30%-60%, and preferably 45%-50% of the whole length 212, 222 of the stator and rotor, respectively. The one step/rim inner surface of the stator 210 and one step/rim outer surface of the rotor 220 together form the mutual geometrical relationship between the stator 210 and the rotor 220.

The minimum length $L_{min}$ can typically be a number of centimeters, i.e. 1-20 centimeters, preferably 3-15 centimeters, such that a fastener can be fully tightened without interrupting the contactless signal connection.

An air pocket 233 is formed between the stator 210 and the rotor 220 when they are fitted together. The axial length $L_{air}$ of the air pocket 233 is axially limited by the first length 214 of the first part of the stator and by the second length 224 of the rotor, i.e. by the steps/rims of the stator 210 and rotor 220, respectively. According to an embodiment of the invention, the air pocket length $L_{air}$ corresponds to 5-10%, and preferably 6-7%, of the whole length 212 of the stator and/or 5-10%, and preferably 6-7%, of the whole length 222 of the rotor.

Thus, the stator 210 and the rotor 220, having the forms as described above and being fitted together, result in a mutual geometric relationship being formed between them, such that a magnetic field B being shared by the stator and rotor windings 216, 226 is usable as a contactless signal connection providing a connection during both rotational and axial movement of the shaft of the tool. This is very advantageous, for example in situations when the tool is fixedly arranged.

The stator windings 216 are arranged on the inside of the second part of the stator and facing the outside of the first part of the rotor. I.e., the stator windings 216 are arranged on the second inner diameter 215 of the stator 210.

The rotor windings 226 are arranged on the outside of the first part of the rotor and facing the inside of the second part of the stator. I.e. the rotor windings 226 are arranged on the first outer diameter 223 of the rotor 220.

Thus, the stator windings 216 and rotor windings 226 are arranged such that they face the air pocket 233 being formed between the stator 210 and the rotor 220. The air pocket 233 is here radially limited by the first (smaller) outer diameter 223 of the rotor 220 and by the second (larger) inner diameter 215 of the stator 210.

The magnetic field B here provides the coupling between the stator 210 and the rotor 220 by use of the mutual inductance coupling energy between the stator and rotor windings 216, 226. Thus, electric energy being applied to the stator windings 216 will essentially immediately be transferred to the rotor windings 226. Correspondingly, electric energy being applied to the rotor windings 226 will essentially immediately be transferred to the stator windings 216.

Hereby, the contactless signal connection between stator 210 and the rotor 220, and thereby also between the body 110 and the at least one sensor arranged on the shaft 120 of the power tool 100, is created. This signal connection is used for transmission of the excitation signals from the stator 210 to the rotor 220 and the sensor signals from the rotor 220 to the stator 210.

Hereby, at least one sensor being arranged on the shaft 120 can provide a sensor signal being related to, e.g. being proportional to, a torque the shaft exerts on e.g. a fastener, such as a nut, it engages with to the body of the tool via the transformer. A control unit can be included within the body of the tool, or external to the tool, and can be arranged for receiving the signals being transferred by the transformer.

According to an embodiment of the present invention, at least one of the first 231 and second 232 mutual distances forms an air gap between the stator 210 and the rotor 220. Thus, the geometrical relationship is here constituted by an air gap distance between at one least part of stator 210 and at least one part of the rotor 220. The widths of these air gaps 231, 232 are, as has been described above, constant, i.e. unaltered, during rotational R and axial A movement of the shaft 120.

As stated above, according to an embodiment, at least one ultrasonic sensor is arranged on the shaft. The one or more ultrasonic sensors are here excited by an excitation signal being provided to the shaft 120 by the transformer 200. This at least one ultrasonic sensor, which can include a piezoelectric element, has to be in contact with the external entity the shaft engages with, e.g. a fastener, to be able to detect the strain of the external entity and therefore the clamping force being provided. It is therefore very important when ultrasonic sensors are being used that no loss of contact occurs between the sensor and the external entity. Thus, the present invention is very advantageous to use when ultrasonic sensors are used, since the performance of the contactless signal connection is guaranteed also during axial movement of the shaft 120.

According to an embodiment of the present invention, at least one shielding means 217, 227 is arranged on at least one of the stator 210 and the rotor 220. This at least one shielding means 217, 227 is arranged on at least one wall delimiting the above mentioned air pocket 233 being formed between the stator 210 and the rotor 220. Preferably, the at least one shielding means 217, 227 is arranged on one or more of the first outer diameter 223 of the rotor 220 and the second inner diameter 215 of the stator 210.

In the transformer 200, the wanted magnetic flux is the magnetic flux passing through the air gaps of the first and second mutual distances 231, 232 between the stator 210 and the rotor 220. However, there is generally also a flux leakage present, which passes through the air flow pocket 233 between the stator 210 and the rotor 220. By shielding one or more of the stator 210 and the rotor 220 according to this embodiment of the present invention, this unwanted flux leakage is reduced, which is advantageous since it results in a more efficient transformer operation.

The shielding means 217, 227 are, according to an embodiment of the invention, made of a metal, such as copper, or another metal having suitable shielding characteristics.

According to an aspect of the present invention, a method for providing a contactless signal connection for a tool 100 is presented. The tool 100 comprises a body 110 and a shaft 120 being movable in relation to the body 110, as described above. A transformer 130, 200 is utilized, which comprises a stator 210, being fixed in relation to the body 110, and a rotor 220, being movable with the shaft 120, both including one or more windings 216, 226. A magnetic field B, which is shared by these windings, is utilized for creating a contactless signal connection between the body 110 and at least one sensor of the shaft 120. According to the method of the invention, a mutual geometrical relationship is formed between the stator 210 and the rotor 220, by the shapes and the mutual fitting of the stator 210 and the rotor 220, such that the contactless signal connection is kept intact for both different axial and rotational movement of the shaft 120.

The Transformer and the method according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A power tool comprising a stationary body, a shaft having at least one sensor and axially and rotationally movable relative to said body, and a transformer, said power tool further comprising:
   a stator which is fixed relative to said body, and including at least one stator winding; and
   a rotor which is movable with said shaft, and including at least one rotor winding,
   wherein:
   a magnetic field is shared by said at least one stator winding and said at least one rotor winding and is used for creating a contactless signal connection between said body and said at least one sensor of said shaft,
   said stator has a substantially tubular form with a substantially uniform outer peripheral diameter and has a first part of a first length and a second part of a second length, said first part being shorter than said second part, and said first part having a smaller inner diameter than an inner diameter of said second part,
   said rotor has a substantially tubular form with a substantially uniform inner peripheral diameter and has a first part of a first length and a second part of a second length, the first part being longer than the second part, and the first part having a smaller outer diameter than an outer diameter of the second part of the rotor and smaller than the inner diameter of the second part of the stator,
   the rotor is arranged inside the stator such that a portion of the first part of the rotor reaches inside the first part of the stator, such that an air gap is formed between said second part of the stator and said second part of the rotor in which air gap a portion of the second part of the stator faces the first part of the rotor over a certain length ($L_{air}$),
   the at least one stator winding is arranged along the second part of the stator close to the first part of the stator and the at least one rotor winding is arranged along the first part of the rotor close to the second part of the rotor such that the at least one stator winding and the at least one rotor winding do not overlap, and
   at least one of said stator and said rotor is at least partly arranged with shielding means for reducing a flux leakage between said stator and said rotor, said shielding means being arranged on one of said stator and said rotor over a portion of said length ($L_{air}$) of said air gap, between the at least one stator winding and the at least one rotor winding.

2. The power tool as claimed in claim 1, wherein said shielding means includes a first shielding unit arranged on said stator and a second shielding unit arranged on said rotor, both shielding units being arranged over a portion of said length ($L_{air}$) of said air gap, between the at least one stator winding and the at least one rotor winding.

3. The power tool as claimed in claim 1, wherein said magnetic field is arranged to carry:
   an excitation signal from said stator to said rotor; and
   a sensor signal from said rotor to said stator, wherein said sensor signal results from an excitation based on said excitation signal.

4. The power tool as claimed in claim 3, wherein said shaft comprises at least one ultrasonic sensor, and wherein said excitation signal is an ultrasonic signal.

5. The power tool as claimed in claim 4, wherein said ultrasonic sensor is arranged to provide a sensor signal which is proportional to a clamp load exerted on parts that are clamped by the power tool.

6. The power tool as claimed in claim 3, wherein said excitation signal is a signal proportional to a torque being exerted on a fastener by said power tool.

7. The power tool as claimed in claim 1, wherein said power tool is a fastener assembly tool.

8. The power tool as claimed in claim 2, wherein said power tool is a fastener assembly tool.

9. The power tool as claimed in claim 3, wherein said power tool is a fastener assembly tool.

10. The power tool as claimed in claim 4, wherein said power tool is a fastener assembly tool.

11. The power tool as claimed in claim 5, wherein said power tool is a fastener assembly tool.

12. The power tool as claimed in claim 6, wherein said power tool is a fastener assembly tool.

* * * * *